(12) United States Patent
Tran et al.

(10) Patent No.: US 11,826,654 B2
(45) Date of Patent: Nov. 28, 2023

(54) DYNAMIC SPAWN ASSETS BASED ON NEWS FEEDS IN A GAME

(71) Applicant: International Business Machines Corporation, Armonk, NY (US)

(72) Inventors: Thai Quoc Tran, San Jose, CA (US); Megan Kostick, Edmonds, WA (US); Michael Brewer, Austin, TX (US); Cindy Han Lu, San Jose, CA (US)

(73) Assignee: International Business Machines Corporation

( * ) Notice: Subject to any disclaimer, the term of this patent is extended or adjusted under 35 U.S.C. 154(b) by 5 days.

(21) Appl. No.: 17/329,493

(22) Filed: May 25, 2021

(65) Prior Publication Data

US 2022/0379222 A1  Dec. 1, 2022

(51) Int. Cl.
*A63F 13/00*  (2014.01)
*A63F 13/67*  (2014.01)
*A63F 13/47*  (2014.01)
*A63F 13/69*  (2014.01)

(52) U.S. Cl.
CPC .............. *A63F 13/67* (2014.09); *A63F 13/47* (2014.09); *A63F 13/69* (2014.09)

(58) Field of Classification Search
CPC ................................ A63F 13/67; A63F 13/47
See application file for complete search history.

(56) References Cited

U.S. PATENT DOCUMENTS

| | | | |
|---|---|---|---|
| 8,160,994 B2 | 4/2012 | Ong et al. | |
| 8,228,325 B2 | 7/2012 | Barbaro Altieri | |
| 8,368,721 B2 | 2/2013 | McCoy | |
| 8,620,743 B2 | 12/2013 | Willis | |
| 8,668,561 B2 | 3/2014 | Hansen et al. | |
| 9,649,566 B2 | 5/2017 | Mahajan et al. | |
| 9,704,346 B2 | 7/2017 | St-Amand | |
| 10,065,115 B2 | 9/2018 | Ahlin | |
| 10,143,926 B2 | 12/2018 | Etter et al. | |
| 2010/0271367 A1 | 10/2010 | Vaden et al. | |
| 2012/0100911 A1 | 4/2012 | Rejen | |
| 2013/0073389 A1* | 3/2013 | Heath | G06Q 30/02 705/14.54 |
| 2013/0073400 A1* | 3/2013 | Heath | G06Q 50/01 715/738 |
| 2013/0073473 A1* | 3/2013 | Heath | G06Q 30/0241 705/319 |
| 2016/0236088 A1 | 8/2016 | Li et al. | |
| 2016/0366483 A1 | 12/2016 | Joyce et al. | |

* cited by examiner

*Primary Examiner* — David L Lewis
*Assistant Examiner* — Eric M Thomas
(74) *Attorney, Agent, or Firm* — Stephen J. Walder, Jr.; Steven Bouknight (57) ABSTRACT

A dynamic asset spawning engine is provided in a data processing system for dynamically spawning assets in a video game based on one or more news feeds. The dynamic asset spawning engine semantically tags a library of video game assets with game tag descriptors. The dynamic asset spawning engine parses and processes the one or more news feeds to identify supplemental tag descriptors and spawning parameters for one or more video game assets in the library of video game assets. The dynamic spawning engine assigns the identified supplemental tag descriptors and spawning parameters to the one or more video game assets. The video game spawns the one or more game assets in the video game in accordance with the supplemental tag descriptors and spawning parameters.

20 Claims, 3 Drawing Sheets

| [BEFORE] VIDEO GAME ASSET DATABASE | |
|---|---|
| ASSET | TAGS |
| frog | Location: ['forest', 'water'], Color: [green, olive] |
| prince | royal, political |
| ... | ... |

FIG. 4

| [AFTER] VIDEO GAME ASSET DATABASE | |
|---|---|
| ASSET | TAGS |
| frog | Spawn: ['rain'], Lifespan: ['3 months'], Location: ['forest', 'water'], Color: [green, olive] |
| prince | royal, political |
| wheelbarrow | farm, garden, tools |
| mermaid | Location: ['water', 'underwater', 'island'] |
| ... | ... |

FIG. 5

DYNAMIC SPAWN ASSETS BASED ON NEWS FEEDS IN A GAME

BACKGROUND

The present application relates generally to an improved data processing apparatus and method and more specifically to mechanisms for dynamically spawning assets in a game based on news feed content.

A video game is an electronic game that involves interaction with a user interface or input device, such as a joystick, controller, keyboard, or motion sensing device, to generate visual feedback for a player. This feedback is shown on a video display device, such as a TV set, monitor, touchscreen, or virtual reality headset. Video games are often augmented with audio feedback delivered through speakers or headphones, and sometimes with other types of feedback, including haptic technology. Video games are defined based on their platform, which include arcade games, console games, and personal computer (PC) games. More recently, the industry has expanded onto mobile gaming through smartphones and tablet computers, virtual and augmented reality systems, and remote cloud gaming. Video games are classified into a wide range of genres based on their type of gameplay and purpose.

Games can be extended with new content and software patches through either expansion packs, which are typically available as physical media, or as downloadable content nominally available via digital distribution. These can be offered freely or can be used to monetize a game following its initial release. Several games offer players the ability to create user-generated content to share with others to play. Some games, mostly those on personal computers, can be extended with user-created modifications or mods that alter or add onto the game; these often are unofficial and were developed by players from reverse engineering of the game, but other games provide official support for modding (modifying) the game.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system for dynamically spawning assets in a video game based on one or more news feeds. The method comprises semantically tagging a library of video game assets with game tag descriptors. The method further comprises parsing and processing the one or more news feeds to identify supplemental tag descriptors and spawning parameters for one or more video game assets in the library of video game assets. The method further comprises assigning the identified supplemental tag descriptors and spawning parameters to the one or more video game assets. The method further comprises spawning the one or more game assets in the video game in accordance with the supplemental tag descriptors and spawning parameters.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

In both multiplayer and single player video games, a set of pre-built instructions exists for generating the world, the non-player characters (N PCs), and the story. While there have been significant strides toward increasing the randomness and variety of these elements, a good solution to dynamically placing objects in appropriate places in the game has not been developed. Video games often get out of date, which puts pressure on the developers to go through the tedious and costly process of creating a new version of the game.

The illustrative embodiments improve the game development process by providing mechanisms to add new assets dynamically rather than requiring developers to generate new assets and story elements from scratch. The illustrative embodiments provide mechanisms to dynamically generate or modify game assets and story elements based on news feeds.

In accordance with an illustrative embodiment, an asset engine pulls in Really Simple Syndication (RSS) news feeds and weather to determine where to place items in the video game, Really Simple Syndication (RSS) is a web feed that allows users and applications to access updates to websites in a standardized, computer-readable format. These feeds can, for example, allow a user to keep track of many different websites in a single news aggregator. The news aggregator will automatically check the RSS feed for new content, allowing the list to be automatically passed from website to website or from website to user. This passing of content is called web syndication. Websites usually use RSS feeds to publish frequently updated information, such as blog entries, news headlines, or episodes of audio and video series. RSS is also used to distribute podcasts. An RSS document (called "feed," "web feed," or "channel") includes full or summarized text, and metadata, like publishing date and author's name. The asset engine receives the news feeds in real time from a server hosting a web site or application programming interface (API) external to the video game.

A machine learning engine interprets the news feed, maps news feed content into a series of buckets (e.g., sentiment, nouns, verbs, descriptors, tags, visual assets). The asset engine captures this content and looks at the possible buckets as defined by the development team of the video game. The development team may determine how tightly the buckets are followed through a set of asset inclusion rules. For example, a space video game may not support assets for frogs, in which case if the asset engine identifies a frog asset, the video game will not have a bucket to which the frog asset can be mapped.

The term "bucket," as used herein, refers to a collection, categorization, or set of items that may appear in the video game, A "side bucket" refers to additional buckets, i.e., additional collections, categorizations, or sets of items that may appear in the video game through the dynamic spawning of the illustrative embodiments.

If the asset engine determines that the conditions in the game allow for the asset to be spawned, then the asset engine adds the asset to the game assets with spawning parameters and other metadata and tags (e.g., location, lifespan, etc).

In the event an item is added to the game meeting all qualifying requirements, the game searches the dialog bucket for relevant sub-buckets that pertain to the added asset. For example, if a frog is added to the game according to the asset inclusion rules, the game engine searches the dialog bucket for NPC dialog for animal enthusiasts or scholar. If found, the game engine applies existing dialog relevant to the asset for animal enthusiast or scholar NPCs to pull from.

Additionally, the asset engine may apply text content from the RSS feed to existing text resources, such as bulletin boards, books found on bookshelves, televisions, video displays, etc.

Asset engine side buckets may include many major aspects of life, such as politics, sports, entertainment, science and technology, etc. In one example, the developers select game side buckets and their associated RSS feeds based on relevance to and compatibility with the game.

Before beginning the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism," Thus, the mechanisms described herein may be implemented as specialized hardware, software executing on hardware to thereby configure the hardware to implement the specialized functionality of the present invention Which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software executing on computer hardware, specialized computer hardware and/or firmware, or any combination thereof that performs the specified functions including, but not limited to, any use of a general and/or specialized processor in combination with appropriate software loaded or stored in a machine readable memory and executed by the processor to thereby specifically configure the processor to perform the specific functions of the illustrative embodiments. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave aide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider), In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
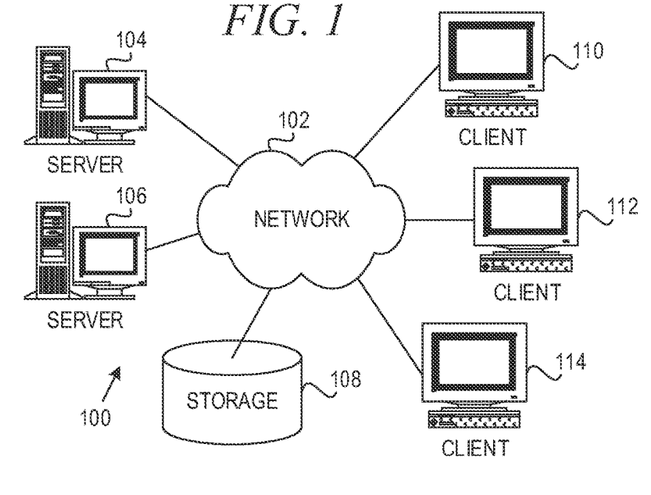
FIG. 1 is an example diagram of a distributed data processing system in which aspects of the illustrative embodiments may be implemented.
Figure 2:
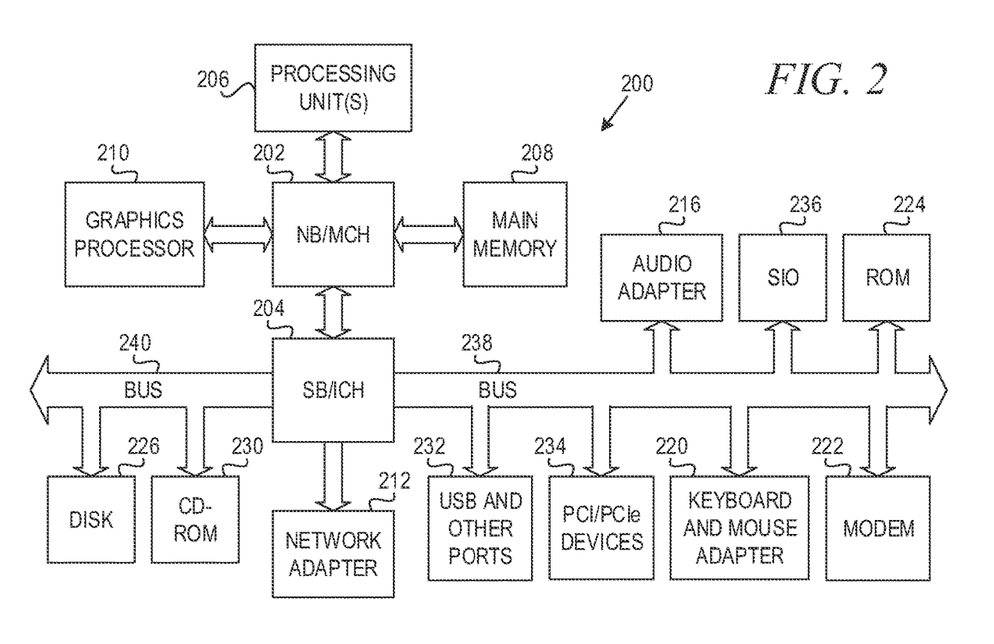
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

For example, in many game modes, game software and update installation files are downloaded from a server data processing system 104, 106 to a client data processing system 110, 112, 114, which may be a personal computer (PC) or game console. In some embodiments, the game itself runs on a client data processing system 110, 112, 114; however, aspects of the illustrative embodiments execute on the server data processing system 104, 106 to process news feeds and dynamically add assets to the game based on the news feeds. In alternative embodiments, the client data processing system 110, 112, 114 performs the functions to dynamically spawn assets in the game based on the news feeds. In online game modes, the client data processing systems 110, 112, 114 send game data, such as character movements and actions, to server 104, 106, which keeps track of characters and assets in a virtual world. Updates to other characters and assets are then sent from server 104, 106 to client data processing systems 110, 112, 114. In a cloud game mode, the clients 110, 112, 114 run thin client software that sends user inputs to servers 104, 106 and receives display updates, while the majority of the game software is executed in servers 104, 106.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in Which the illustrative embodiments of the present invention may be implemented.

As shown in FIG. 1, one or more of the computing devices, e.g., server 104, may be specifically configured to implement dynamically spawning assets based on news feeds in a game. The configuring of the computing device may comprise the providing of application specific hardware, firmware, or the like to facilitate the performance of the operations and generation of the outputs described herein with regard to the illustrative embodiments. The configuring of the computing device may, also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general-purpose computing device. Moreover, as described hereafter, the implementation of the mechanisms of the illustrative embodiments improves the functionality of the computing device and provides a useful and concrete result that facilitates dynamically spawning assets in a game based on news feeds.

These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226. CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SK)) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power processor-based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data, A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to dynamically spawning assets in a video game based on news feeds.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SNIP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
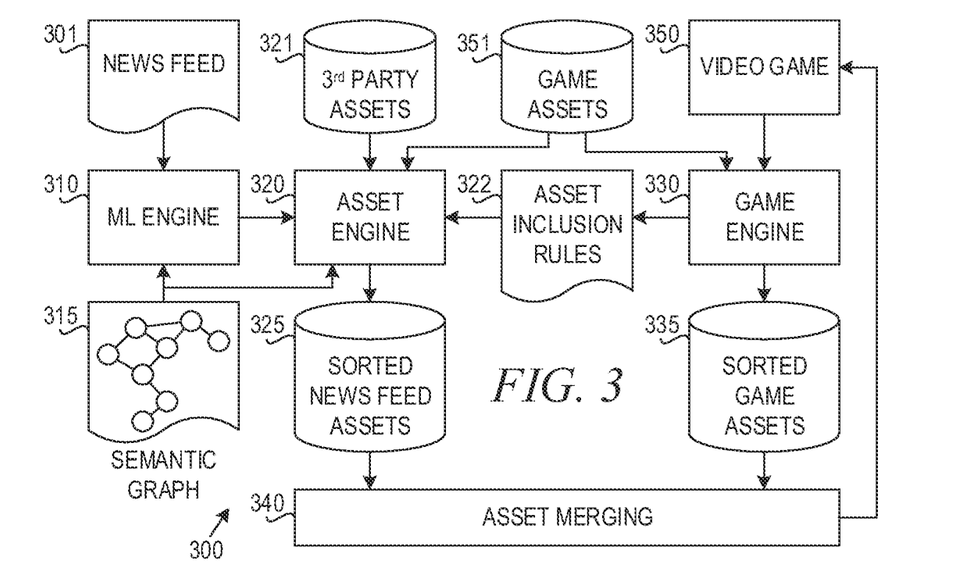
FIG. 3 is a block diagram of dynamic asset spawning system in accordance with an illustrative embodiment.

FIG. 3 is a block diagram of dynamic asset spawning system in accordance with an illustrative embodiment. Dynamic asset spawning system 300 includes machine learning engine 310, asset engine 320, and game engine 330. The existing game world is represented by game assets 351 and rendered using video game software 350 and game engine 330. In accordance with the illustrative embodiment, game assets 351 are semantically tagged by game engine 330 into game tags. These tags may represent multi-multi (many-to-many) relationships. This includes things like locations town, forest, lake, mountain, cave, spaceship, etc.), lifespan of an object (e.g., for animated objects like animals), proximal density (certain objects should only exist within a certain distance of each other (e.g., one prince per village)), asset tags (e.g., prince, purple frog, rock, mushroom, wheelbarrow, cronut), semantic relationships (e.g., a spoon sits on a table), placement relationship (faces of the polygon where spawning can occur (e.g., on a table and not under the table)), whether an object can be nested or grouped into other objects (e.g., object can be inside a box), environmental factors (e.g., spawn only when it rains, when temperature is above a threshold, distance from other objects, etc.), time of day (e.g., owls appear at night, roosters appear in the morning), and so forth.

Machine learning (ML) engine 310 parses articles in news feed 301 and performs natural language processing, semantic, and sentiment analysis to determine entities that may correspond to game assets. The sentiment analysis provides clues as to the feeling around a situation so that the descriptions or appearance of spawned assets can be modified accordingly. For example, during bad weather, a character may have an angry face rather than a smile, or a cloud may be dark and stormy versus white and fluffy.

In one example embodiment, news feed 301 is a Really Simple Syndication (RSS) news feed. ML engine 310 receives the news feeds in real time from a server hosting a web site or application programming interface (API) external to the video game. ML engine 310 recognizes nouns, verbs, descriptors, tags visual assets, relationships, etc. For example, an article about the royal family may mention a prince, which may correspond to a prince asset in a fantasy role playing game. As another example, an article may publish about dogs mysteriously turning blue or pink. ML engine 310 would parse these articles and identify entities of prince and dog, colors blue and pink, the verb turning as it relates to color, etc. ML engine 310 uses semantic graph 315 to identify relationships between entities identified in news feed. 301. For example, MI, engine 310 may determine that a king is married to a queen or that a dog is a pet. These relationships may be used by asset engine 320 to determine whether entities discovered by ML engine 310 in news feed 301 correspond to game assets.

Asset engine 320 maps entities discovered by ML engine 310 in news feed 301 to game assets, such as game assets 351 or third party assets 321. Game assets 351 are the assets that are provided by developers as making up the game world of video game 350. Thus, if video game 350 is a fantasy role playing game, then game assets 351 may include a king, a queen, wizards, dragons, and the like. On the other hand, if video game 350 is a western game, then game assets 351 may include horses, lassos, a sheriff, a saloon, and the like. Third party assets 321 are assets provided by third parties, such as independent developers or molders. Third party assets 321 may be provided to augment video game 350 to extend playability. In one embodiment, asset engine 320 maps entities into buckets, such as sentiment, nouns, verbs, descriptors, tags, visual assets, and so forth. Asset engine 320 matches the assets to game tags in asset repositories 351, 321 to determine where and when to spawn objects.

Asset engine 320 maps assets according to asset inclusion rules 322 provided by game engine 330. Asset inclusion rules 322 include rules and conditions for including assets in video game 350. For example, a developer may set limits on the number of objects that can be included, when assets can be spawned, where assets can be spawned, what types of assets can be spawned, the lifespan of dynamically spawned assets, and the like. The asset inclusion rules may include location rules, time rules, asset type rules, asset lifespan rules, asset density rules, relationship rules, and spawning area rules.

As an example, a location rule specifies that an asset can be spawned on a terrain type, on another object, or within a group of objects. Examples of terrain types include grass, sand, rocks, pavement, etc. These are easily identifiable via the textures used by the game developer. It is possible for a terrain to be gradient between multiple types, in which case there must be a threshold that must be met before spawning takes place.

An example of spawning on another object is a vase on top of a table. Special relationships would be established ahead of time and defined in the metadata of the assets. The table object may have defined areas where spawning can occur. In this case, the tabletop is the only area where other objects can be spawned. Vases would have defined areas where they can spawn. In this case, the bottom of the vase is the only area where spawning can occur. Additionally, these two objects would have to be linked via a semantic graph where each node is an object, and the edges are relationships between them. Objects themselves can be grouped into a collection. This collection can serve as an object, and spawning rules may also be applied here.

Relationship rules define relationships between objects. For example, a relationship rule may specify that a princess is an offspring of a king and queen and that a prince is royalty and political. As another example, a relationship rule may specify that frogs eat flies. These relationship rules specify constraints on how the assets may be used within video game 350.

Asset inclusion rules 322 may also include spawning area rules. For example, a spawning area rule may specify that there may be only one prince in a particular area at a given time, Another spawning area rule may indicate that polar bears may be spawned only in northern regions, for example.

As asset engine 320 maps content discovered by ML engine 310 from news feed 301 to assets in asset libraries 321, 351 according to asset inclusion rules 322, asset engine 320 stores the assets in sorted news feed assets 325, Game engine 330 processes game assets 351 according to video game code 350 and stores the results in sorted game assets 335. Then, assert merging engine 340 adds the new assets from the sorted news feed assets 325 into the sorted game assets 335 and/or merges new tags. The resulting set of assets is provided back to video game code 350. Thus, the asset merging engine 340 may provide new tags to existing assets, such as adding a spawn location, changing a color, providing an NPC new dialog, or the like.

In one embodiment, the asset engine 320 may search an existing dialog library, which may be within game assets 351, for dialog that corresponds to news feed assets. Asset engine 320 may then assign these portions of dialog to NPCs in association with the news feed assets. For example, if the asset is a prince, then dialog that mentions a prince may be assigned to NPCs within predetermined proximity to the prince asset. Many games have NPCs speak portions of dialog at random intervals; therefore, asset engine 320 may add parameters to the dialog to increase the frequency of the dialog being spoken within the game. In another example, asset engine 320 may generate new text content that mentions news feed assets. For example, asst engine 320 may use English Slot Grammar (ESG) rules or templates to generate sentences that mention objects or actions corresponding to the news feed assets. Asset engine 320 may then assign this new text content as dialog for NPCs. Alternatively, asset engine 320 may apply this new text content to text assets in the game, such as bulletin boards, books, and the like.

Assets may be categorized into buckets. In one embodiment, there may be game buckets including the game assets 335, which are developed specifically for the main story and side missions of video game 350, and side buckets including sorted news feed assets 325, which are selected by the developers based on relevant choices to match the game.

As an example, a prince falls into both entertainment and politics. The asset engine 320 may choose to allow the game to render the prince in buckets for politics, entertainment, or both. If the game is rendering an NPC, the game determines to only render one copy of the prince per scene the player is interacting with, but if it is in multiple buckets, the prince can be interacting with the common folk in one scene and then giving a speech to the senate in another, because the prince tell into two buckets. Asset engine 320 determines the prince in a news article is a proper noun and a person; therefore, the asset is an NPC of type unique, which cannot spawn multiple in one scene. The unique NPC type is determined by, if nothing else, name capitalization in the news article.

Figure 4:
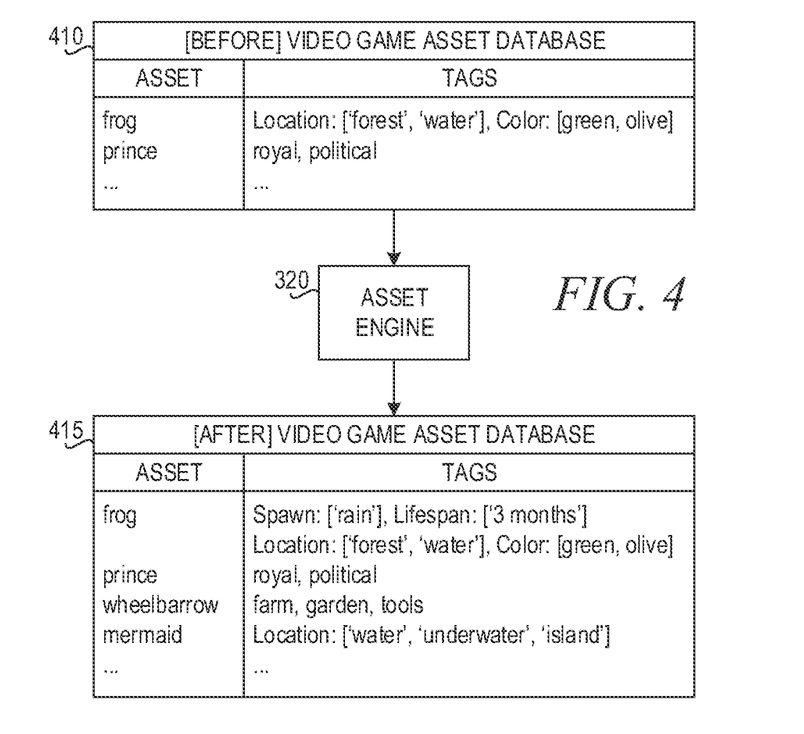
FIG. 4 depicts an example video game asset database with dynamically, added assets based on news feeds in accordance with an illustrative embodiment.

FIG. 4 depicts an example video game asset database with dynamically added assets based on news feeds in accordance with an illustrative embodiment. Video game asset database 410 contains video game assets before dynamically adding assets based on news feeds. In the depicted example, video game asset database 410 includes a frog asset and a prince asset. The frog asset has location tags of "forest" and "water" and color tags of "green" and "olive." The prince asset has tags of "royal" and "political."

In an example scenario, asset engine 320 processes a news feed containing an article about reports of raining frogs in Borneo other articles that mention a wheelbarrow and a mermaid. Video game asset database 415 contains the video game assets after dynamically adding assets. Asset engine 320 adds new assets for the wheelbarrow and mermaid. In addition, asset engine 320 adds spawn and lifespan parameters for frog, such that the frogs are spawned as "rain." and the lifespan of the frogs is set for "3 months."

As a result of the dynamically added assets, the video game will then spawn frog assets as rain with a lifespan of 3 months. Also, the video game will spawn a wheelbarrow and a mermaid. Thus, the asset engine 320 dynamically modifies the content of the video game by supplementing the game assets and their metadata, such as spawning parameters and other tags, based on articles in a news feed.

Figure 5:
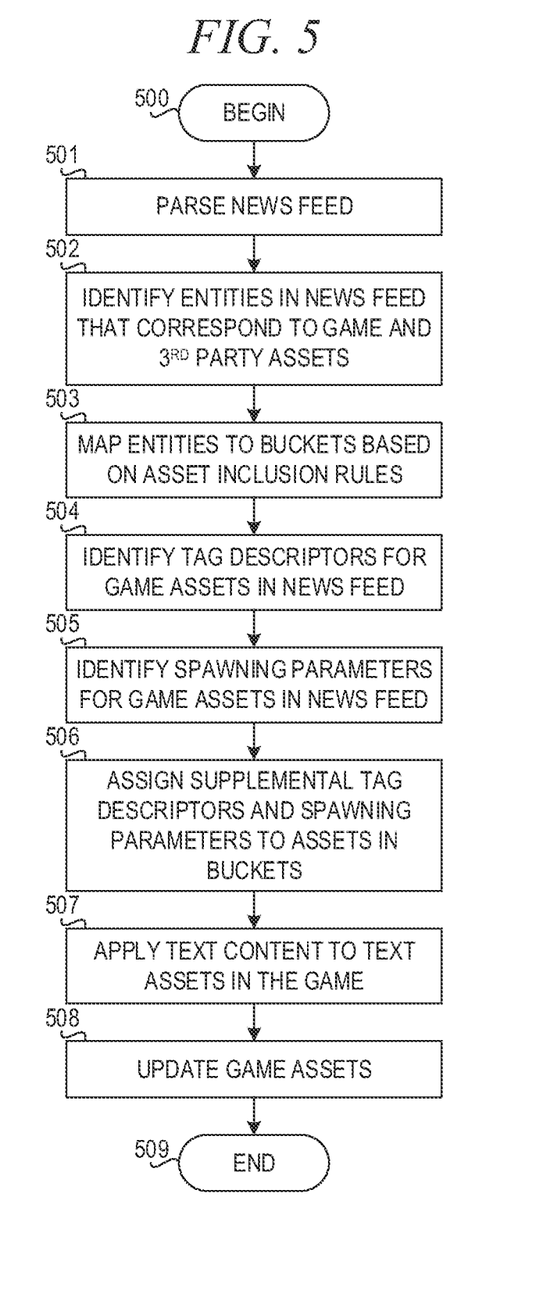
FIG. 5 is a flowchart illustrating operation of a dynamic asset spawning system in accordance with an illustrative embodiment.

FIG. 5 is a flowchart illustrating operation of a dynamic asset spawning system in accordance with an illustrative embodiment. Operation begins (block 500), and the dynamic asset spawning system parses articles in a news feed (block 501). The dynamic asset spawning system uses machine learning to perform natural language processing and semantic analysis to identify entities in the news feed that correspond to game and third-party assets (block 502). The dynamic asset spawning system maps entities into buckets based on asset inclusion rules (block 503).

Next, the dynamic asset spawning system identifies supplemental tag descriptors for game assets in the news feed (block 504). For example, an article may state that frogs are green and brown and live near muddy water. The dynamic asset spawning system may identify "green" and "brown" as tag descriptors for a frog asset. The dynamic asset spawning then identifies spawning parameters for game assets in the news feed (block 505). In the above example, the dynamic asset spawning system identifies "near muddy water" as a location to help determine where to spawn the frog asset. The dynamic asset spawning system assigns the identified supplemental tag descriptors and spawning parameters to the assets in the buckets (block 506). The dynamic asset spawning system applies text content from the articles in the news feed to text assets in the game (e.g., bulletin boards, books, video displays, etc.) (block 507).

Thereafter, the dynamic asset spawning system updates the game assets (block 508), and operation ends (block 509). Therefore, the game is dynamically updated to include content based on news feeds. The assets in the game include objects and actions that are inspired by articles in news feeds.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications, Wireless communication-based network adapters may also be utilized including, but not limited to, 802.11 a/b/gin wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for dynamically spawning assets in a video game based on one or more news feeds, the method comprising:
    semantically tagging a library of video game assets with game tag descriptors;
    parsing and processing the one or more news feeds to identify supplemental tag descriptors and spawning parameters for one or more video game assets in the library of video game assets;
    assigning the identified supplemental tag descriptors and spawning parameters to the one or more video game assets; and
    spawning, by the data processing system, the one or more game assets in the video game in accordance with the supplemental tag descriptors and spawning parameters.

2. The method of claim 1, wherein the game tag descriptors comprise at least one of location, time, lifespan, proximal density, asset attributes, or semantic relationships.

3. The method of claim 1, wherein the one or more news feeds are received in real time from a server hosting a web site or application programming interface (API) external to the video game.

4. The method of claim 1, wherein the one or more news feeds comprise one or more Really Simple Syndication (RSS) news feeds.

5. The method of claim 1, wherein processing the one or more news feeds comprises performing machine learning, natural language processing, semantic analysis, and sentiment analysis.

6. The method of claim 1, wherein assigning the identified supplemental tag descriptors to the one or more video game assets comprises mapping the supplemental tag descriptors to semantically categorized news feed assets and determining whether the semantically categorized news feed assets match video game assets related to topics relevant to the video game.

7. The method of claim 1, wherein assigning spawning parameters to the supplemental game assets comprises applying a set of asset inclusion rules.

8. The method of claim 7, wherein assigning spawning parameters to the supplemental game assets further comprises determining a location in the video game to place the one or more video game assets based on the set of asset inclusion rules.

9. The method of claim 7, wherein the asset inclusion rules comprise location rules, time rules, asset type rules, asset lifespan rules, asset density rules, relationship rules, and spawning area rules.

10. The method of claim 1, further comprising assigning text content from the one or more news feeds to text assets in the library of video game assets.

11. A computer program product comprising a computer readable storage medium having a computer readable program stored therein, wherein the computer readable program, when executed on a computing device, causes the computing device to:
   semantically tag a library of video game assets with game tag descriptors;
   parse and process the one or more news feeds to identify supplemental tag descriptors and spawning parameters for one or more video game assets in the library of video game assets;
   assign the identified supplemental tag descriptors and spawning, by the computing device, parameters to the one or more video game assets; and
   spawn the one or more game assets in the video game in accordance with the supplemental tag descriptors and spawning parameters.

12. The computer program product of claim 11, wherein the game tag descriptors comprise at least one of location, time, lifespan, proximal density, asset attributes, or semantic relationships.

13. The computer program product of claim 11, wherein the one or more news feeds are received in real time from a server hosting a web site or application programming interface (API) external to the video game.

14. The computer program product of claim 11, wherein the one or more news feeds comprise one or more Really Simple Syndication (RSS) news feeds.

15. The computer program product of claim 11, wherein processing the one or more news feeds comprises performing machine learning, natural language processing, semantic analysis, and sentiment analysis.

16. The computer program product of claim 11, wherein assigning the identified supplemental tag descriptors to the one or more video game assets comprises mapping the supplemental tag descriptors to semantically categorized news feed assets and determining whether the semantically categorized news feed assets match video game assets related to topics relevant to the video game.

17. The computer program product of claim 11, wherein assigning spawning parameters to the supplemental game assets comprises applying a set of asset inclusion rules.

18. The computer program product of claim 17, wherein the asset inclusion rules comprise location rules, time rules, asset type rules, asset lifespan rules, asset density rules, relationship rules, and spawning area rules.

19. The computer program product of claim 11, wherein the computer readable program further causes the computing device to assign text content from the one or more news feeds to text assets in the library of video game assets.

20. An apparatus comprising:
   a processor; and
   a memory coupled to the processor, wherein the memory comprises instructions which, when executed by the processor, cause the processor to:
   semantically tag a library of video game assets with game tag descriptors;
   parse and process the one or more news feeds to identify supplemental tag descriptors and spawning parameters for one or more video game assets in the library of video game assets;
   assign the identified supplemental tag descriptors and spawning parameters to the one or more video game assets; and
   spawn, by the processor, the one or more game assets in the video game in accordance with the supplemental tag descriptors and spawning parameters.

* * * * *